US010809977B2

United States Patent
Takeuchi

(10) Patent No.: US 10,809,977 B2
(45) Date of Patent: Oct. 20, 2020

(54) ANALYSIS DEVICE, ANALYSIS METHOD, AND COMPUTER READABLE MEDIUM

(71) Applicant: MITSUBISHI ELECTRIC CORPORATION, Chiyoda-ku, Tokyo (JP)

(72) Inventor: Takeshi Takeuchi, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 421 days.

(21) Appl. No.: 15/569,673

(22) PCT Filed: May 28, 2015

(86) PCT No.: PCT/JP2015/065465
§ 371 (c)(1),
(2) Date: Oct. 26, 2017

(87) PCT Pub. No.: WO2016/189747
PCT Pub. Date: Dec. 1, 2016

(65) Prior Publication Data
US 2018/0121163 A1   May 3, 2018

(51) Int. Cl.
*H03F 1/26* (2006.01)
*G06F 7/02* (2006.01)
(Continued)

(52) U.S. Cl.
CPC .......... *G06F 7/026* (2013.01); *G05B 23/024* (2013.01); *G06F 16/00* (2019.01); *G06F 16/60* (2019.01); *G06K 9/00496* (2013.01)

(58) Field of Classification Search
None
See application file for complete search history.

(56) References Cited

U.S. PATENT DOCUMENTS 6,609,085 B1    8/2003  Uemura et al.
2002/0023116 A1 *  2/2002  Kikuchi ................ G06F 17/147
                                                          708/402
(Continued)

FOREIGN PATENT DOCUMENTS

JP    2000-048047 A    2/2000
JP    2002-132644 A    5/2002
(Continued)

OTHER PUBLICATIONS

International Search Report (PCT/ISA/210) dated Jun. 23, 2015, by the Japanese Patent Office as the International Searching Authority for International Application No. PCT/JP2015/065465.
(Continued)

*Primary Examiner* — Aditya S Bhat
(74) *Attorney, Agent, or Firm* — Buchanan Ingersoll & Rooney PC

(57) ABSTRACT

A first computation unit acquires a first variation coefficient representing characteristics of linear variation of first time-series data, and calculates a value of a start time point and a value of an end time point of the first time-series data. A second computation unit acquires a second variation coefficient representing characteristics of linear variation of second time-series data, and calculates a commencing time point in the second time-series data, and a completing time point obtained by adding a time width between the start time point and the end time point to the commencing time point. A difference integrated value is calculated between paired time points which are in the same positional relationship in a range from the start time point to the end time point and in a range from the commencing time point to the completing time point, without calculating values of intervening time points.

15 Claims, 8 Drawing Sheets

(51) Int. Cl.
*G06K 9/00* (2006.01)
*G05B 23/02* (2006.01)
*G06F 16/00* (2019.01)
*G06F 16/60* (2019.01)

(56) References Cited

U.S. PATENT DOCUMENTS

| | | |
|---|---|---|
| 2013/0238619 A1 | 9/2013 | Hanaoka et al. |
| 2013/0246073 A1 | 9/2013 | Sakata |
| 2014/0201126 A1* | 7/2014 | Zadeh .................... A61B 5/165 706/52 |
| 2014/0297606 A1 | 10/2014 | Li et al. |

FOREIGN PATENT DOCUMENTS

| | | |
|---|---|---|
| JP | 2004-133588 A | 4/2004 |
| JP | 2007-221280 A | 8/2007 |
| JP | 2010-128853 A | 6/2010 |
| JP | 2012-117987 A | 6/2012 |
| JP | 2012-134858 A | 7/2012 |
| JP | 2014-021162 A | 2/2014 |
| JP | 2014-194762 A | 10/2014 |

OTHER PUBLICATIONS

Written Opinion (PCT/ISA/237) dated Jun. 23, 2015, by the Japanese Patent Office as the International Searching Authority for International Application No. PCT/JP2015/065465.

\* cited by examiner

Fig. 2

COMPRESSED TIME-SERIES DATA A

| TIME POINT INFORMATION | PREDICTED VALUE | RESIDUAL CODED DATA |
|---|---|---|
| t_1 | 2.5 | (0.5, i) |
| t_i+1 | 5.0 | (0.1, j) |

201

COMPRESSED TIME-SERIES DATA B

| TIME POINT INFORMATION | PREDICTED VALUE | RESIDUAL CODED DATA |
|---|---|---|
| t_1 | 1.0 | (1.0, n) |
| t_n+1 | 0.5 | (0.7, m) |

202

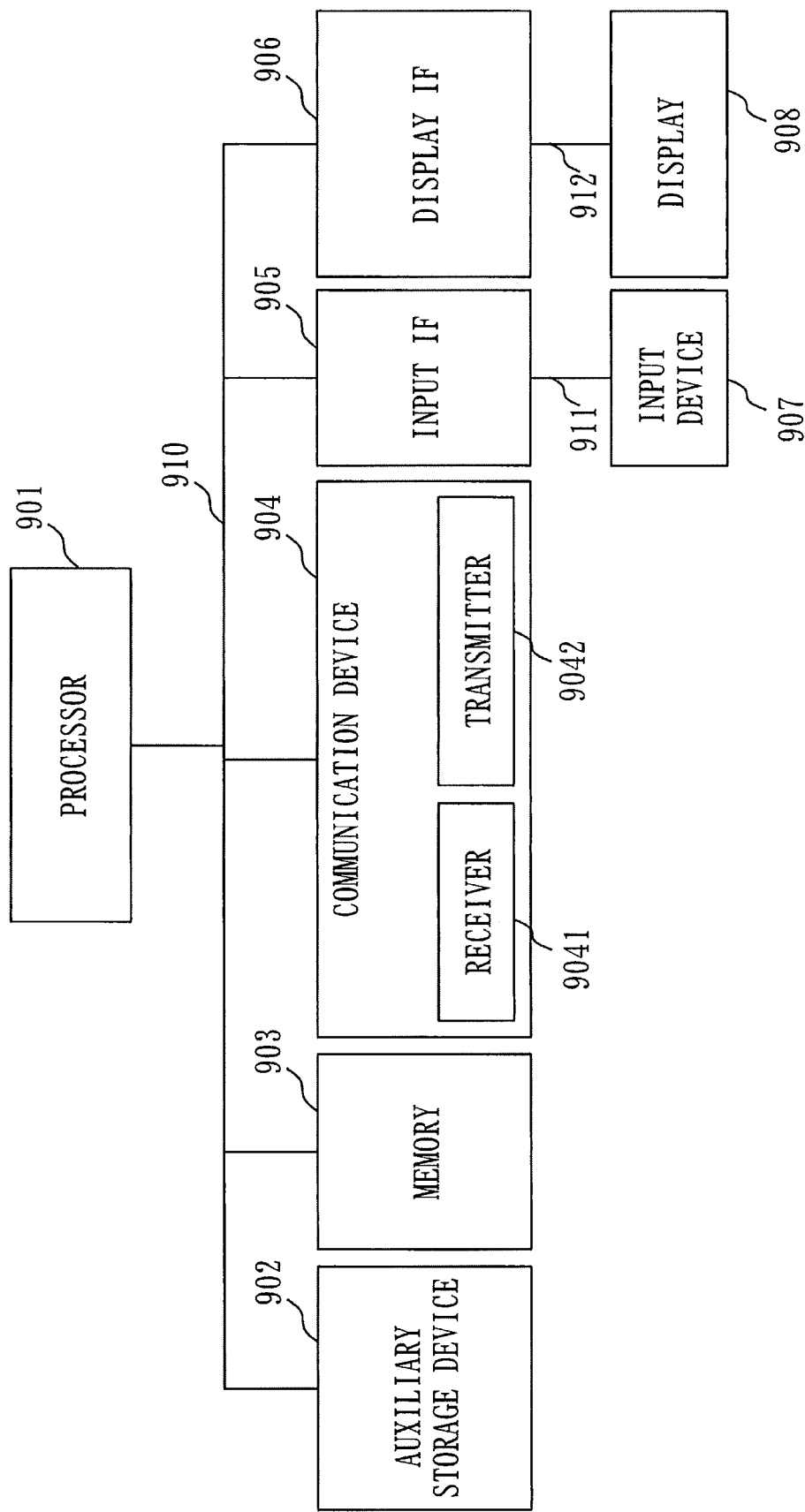

ANALYSIS DEVICE, ANALYSIS METHOD, AND COMPUTER READABLE MEDIUM

CROSS-REFERENCE TO RELATED APPLICATIONS

This application is a National Stage of Application No. PCT/JP2015/065465, filed May 28, 2015, the entire content of which is incorporated by reference herein.

Technical Field

The present invention relates to analysis of time-series data composed of a numerical data sequence.

Background Art

As a method of analyzing sensor data which is time-series data collected from sensors and the like, there exists a method disclosed in Patent Literature 1.

Patent Literature 1 discloses a method for detecting changes in conditions in plant facilities.

More specifically, Patent Literature 1 discloses a method of detecting a difference in the length of a compressed data sequence by using different compression methods, which are dynamic coding and static coding, on the basis of a preset threshold value, thereby detecting changes in the condition of a plant facility.

In addition, as a method of analyzing time-series data, similarly, there exists a method disclosed in Patent Literature 2.

Patent Literature 2 discloses a method of enabling analysis by displaying a specific part of time-series data in a short time.

More specifically, Patent Literature 2 discloses a method of extracting a maximum value and a minimum value in units of a file from periodically produced time-series data files, generating compressed data, and the compressed data are stored.

The method disclosed in Patent Literature 2 then displays the maximum value and the minimum value in a short time on the assumption that what a user wants to refer to are the maximum value and the minimum value of a given range.

The method disclosed in Patent Literature 1 and the method disclosed in Patent Literature 2 are to achieve display of changes in the condition of one type of numerical data or a graph.

In time-series data analysis, however, there is a need for searching for a part that matches a numerical data sequence (hereinafter referred to as model data) representing a numerical change (graph) in normal condition or abnormal condition from sensor data (time-series data) of an operating plant facility.

There is also a need for filtering sensor data (time-series data) of an operating plant facility to obtain a part that matches model data.

For such search or filtering as mentioned above, comparison between model data and sensor data is needed.

In addition, sensor data are longer in time series than model data.

Thus, the sensor data and the model data need to be compared with the time point for comparison in the sensor data being gradually shifted depending on a sampling period, and a part where the difference between the sensor data and the model data is the smallest or a part where the difference between the sensor data and the model data is smaller than a threshold value needs to be detected.

Neither of the method disclosed in Patent Literature 1 and the method disclosed in Patent Literature 2 aims at comparison between two time-series data.

Neither of the method disclosed in Patent Literature 1 and the method disclosed in Patent Literature 2 can therefore satisfy the need for searching the aforementioned sensor data for a part that matches the model data.

In addition, neither of the method disclosed in Patent Literature 1 and the method disclosed in Patent Literature 2 can satisfy the need for filtering sensor data to obtain a part of sensor data that matches model data.

Patent Literature 3 discloses a lossless compression method with high compression ratio applicable to data of various distributions including widely dispersed data and temporally non-stationary data.

CITATION LIST

Patent Literature

Patent Literature 1: JP 2007-221280 A
Patent Literature 2: JP 2010-128853 A
Patent Literature 3: JP 2012-134858 A

SUMMARY OF INVENTION

Technical Problem

For comparison of two time-series data compressed by the compression method disclosed in Patent Literature 3, numerical data sequences of the respective time-series data need to be decompressed and expanded (calculation of the values of respective time points) on a memory, and processes of comparing numerical values and calculating differences then need to be repeated, which is not necessarily efficient.

Thus, even when the compression method of Patent Literature 3 is used, processes of decompessing and expanding two numerical data sequences on a memory, comparing the two numerical data sequences at each time point of a sampling period, and integrating difference values at respective time points need to be repeated with gradually shifting the time point depending on the sampling period.

This results in a problem of an enormous amount of calculation depending on the granularity of the sampling period and the length of the period for comparison, which requires a long time for an analysis result to be returned.

A major object of the present invention is to solve such problems as described above, that is, to efficiently obtain similarity degree between a plurality pieces of time-series data.

Solution to Problem

An analysis device according to the present invention includes:

a first computation unit to acquire, as a first variation coefficient, a variation coefficient representing a characteristics of linear variation of first time-series data in which values of a plurality of time points taken at a constant step size linearly vary, and calculate a value of a start time point and a value of an end time point of the first time-series data on the basis of the acquired first variation coefficient;

a second computation unit to acquire, as a second variation coefficient, a variation coefficient representing a characteristics of linear variation of second time-series data in which values of a plurality of time points taken at the step size linearly vary, and calculate a value of a commencing time point, which is a given time point in the second time-series data, and a value of a completing time point obtained by adding a time width between the start time point and the end time point to the commencing time point, on the basis of the acquired second variation coefficient; and a difference integrated value computation unit to calculate an integrated value of a difference value between paired time points which are in the same positional relationship in a range from the start time point to the end time point and in a range from the commencing time point to the completing time point on the basis of the value of the start time point, the value of the end time point, the value of the commencing time point, and the value of the completing time point, without calculating values of respective time points between the start time point and the end time point and values of respective time points between the commencing time point and the completing time point.

Advantageous Effects of Invention

According to the present invention, an integrated value of a difference value between paired time points which are in the same positional relationship in a range from a start time point to an end time point and in a range from a commencing time point to an completing time point can be calculated, without calculation of the values of the respective time points between the start time point and the end time point and the values of respective time points between the commencing time point and the completing time point. Threrefore, it is not necessary to calculate the difference value for each pair of time points and it is not necessary to integrate the difference value of each pair of time points, which allows the similarity degree between a plurality pieces of time-series data to be efficiently obtained.

BRIEF DESCRIPTION OF DRAWINGS

FIG. 2 is a table illustrating an example of compressed time-series data according to the first embodiment.

FIG. 8 is a diagram illustrating an example hardware configuration of the analysis device according to the first embodiment.

DESCRIPTION OF EMBODIMENTS

First Embodiment

*Description of Configuration*

Figure 1:
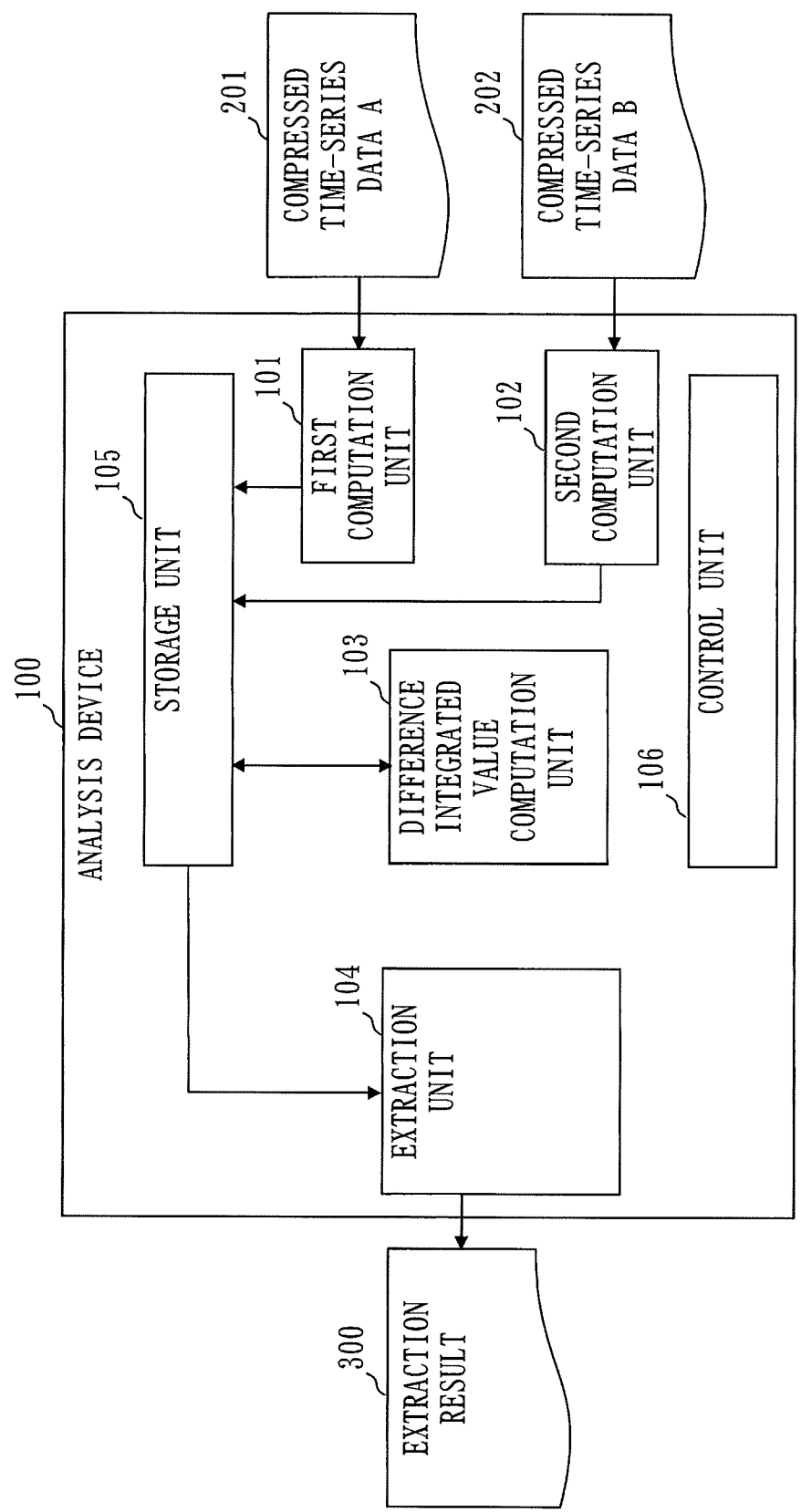
FIG. 1 is a diagram illustrating an example functional module configuration of an analysis device according to a first embodiment.

FIG. 1 illustrates an example functional module configuration of an analysis device 100 according to the present embodiment.

The analysis device 100 according to the present embodiment receives compressed time-series data A 201 and compressed time-series data B 202 as input, and outputs an extraction result 300.

The compressed time-series data A 201 is data obtained by compression of model data, which is time-series data representing numerical changes in normal condition or abnormal condition.

The compressed time-series data B 202 is data obtained by compression of sensor data, which is time-series data collected from a sensor in an operating plant facility.

As described above, the sensor data is longer in time series than the model data.

Time-series data (hereinafter referred to as time-series data A) before compression of the compressed time-series data A 201 is data in which values of a plurality of time points taken at a constant step size (specifically, a sampling period) linearly vary.

The time-series data A is sectioned into a plurality of linearly varying sections having linearly varying characteristics different from one another.

The time-series data A corresponds to an example of first time-series data.

In addition, time-series data (hereinafter referred to as time-series data B) before compression of the compressed time-series data B 202 is data in which values of a plurality of time points taken at the same constant step size (specifically, a sampling period) as that of the time-series data A linearly vary.

The time-series data B is sectioned into a plurality of linearly varying sections having linearly varying characteristics different from one another.

The time-series data B corresponds to an example of second time-series data.

The compressed time-series data A 201 and the compressed time-series data B 202 are data as illustrated in FIG. 2, for example.

FIG. 2 illustrates an example in which run-length codes are used in residual coding and an immediately preceding value is used as a predicted value, which is the simplest linear prediction.

The compressed time-series data A 201 and the compressed time-series data B 202 in FIG. 2 are each constituted by a plurality of linearly varying sections.

Respective rows of the compressed time-series data A 201 and respective rows of the compressed time-series data B 202 in FIG. 2 correspond to the linearly varying sections.

A time point indicated by time point information represents a start time point of each linearly varying section.

In addition, the step size of time point corresponds to the sampling period as mentioned above.

In addition, a predicted value represents an initial value of linear variation.

The values of first terms (0.5, 0.1, 1.0, 0.7) of residual coded data represent inclinations of linear variations, and the values of second terms (i, j, n, m) thereof represent durations of the linear variations.

In the following, assume that $i+1 < n \leq j < m$ is satisfied.

For example, the compressed time-series data A 201 indicates that linear variation with an inclination of 0.5 continues from time point $t\_1$ to time point $t\_i$ and that linear variation with an inclination of 0.1 continues from time point $t\_j+1$ to time point $t\_j$.

In addition, the compressed time-series data B 202 indicate that linear variation with an inclination of 1.0 continues from time point t_1 to time point t_n and that linear variation with an inclination of 0.7 continues from time point t_n+1 to time point t_m.

The predicted value, and the first term value and the second term value of the residual coded data of the compressed time-series data A 201 illustrated in FIG. 2 are coefficients representing characteristics of linear variation of the time-series data A, and will be referred to as a first variation coefficient.

In addition, the predicted value, and the first term value and the second term value of the residual coded data of the compressed time-series data B 202 are coefficients representing characteristics of linear variation of the time-series data B, and will be referred to as a second variation coefficient.

The compressed time-series data A 201 and the compressed time-series data B 202 are residual code sequence data generated by a data compression device of Patent Literature 3, for example.

In FIG. 1, the first computation unit 101 acquires the first variation coefficient of each linearly varying section of the compressed time-series data A 201 illustrated in FIG. 2.

The first computation unit 101 then calculates the value of the start time point and the value of the end time point of each linearly varying section on the basis of the acquired first variation coefficient.

Specifically, the first computation unit 101 calculates the value of time point t_1 that is the start time point, and the value of time point t_i that is the end time point.

The first computation unit 101 also calculates the value of time point t_i+1 that is the start time point, and the value of time point t_j that is the end time point.

The operation of the first computation unit 101 corresponds to an example of a first computation process.

The second computation unit 102 acquires the second variation coefficient of each linearly varying section of the compressed time-series data B 202 illustrated in FIG. 2.

The second computation unit 102 then calculates the value of the commencing time point, and a value of an intermediate completing time point obtained by adding a time width between the start time point and the end time point of the first linearly varying section in the time-series data A to the commencing time point, on the basis of the acquired second variation coefficient.

The second computation unit 102 also calculates the value of an intermediate commencing time point that is a time point subsequent to the intermediate completing time point.

Furthermore, the second computation unit 102 calculates the value of another intermediate completing time point obtained by adding a time width between the start time point and the end time point of the subsequent linearly varying section in the time-series data A to the intermediate commencing time point.

The second computation unit 102 then repeats the same procedures for each linearly varying section in the time-series data A, to calculate the value of the completing time point corresponding to the end time point of the last linearly varying section in the time-series data A.

The second computation unit 102 also repeats the operation of shifting the commencing time point at each step size (sampling period) and calculating a value of a new commencing time point after the shift, and a value of a new intermediate commencing time point, a value of a new intermediate completing time point and a value of a new completing time point, which are associated with the new commencing time point, on the basis of the second variation coefficient.

The operation of the second computation unit 102 corresponds to an example of a second computation process.

For example, in a case where time point t_1 in FIG. 2 is specified as the commencing time point, the second computation unit 102 designates the values of time point t_j as the intermediate completing time point, time point t_j+1 as the intermediate commencing time point, and time point t_j as the completing time point, and calculates the value of each time point.

Since i+1<n≤j<m is satisfied, the value of time point t_1, the value of time point t_i, and the value of time point t_j+1 are calculated by linear calculation using the predicted value of 1.0 and the first term value of 1.0 of the residual coded data on the first row of the time-series data B in FIG. 2.

In addition, the value of time point t_j is calculated by linear calculation using the predicted value of 0.5 and the first term value of 0.7 of the residual coded data on the second row of the time-series data B in FIG. 2.

Subsequently, the second computation unit 102 shifts the commencing time point to t_2, and calculates the values of the intermediate completing time point t_i+1, the intermediate commencing time point t_i+2, and the completing time point t_j+1 by similar procedures.

The second computation unit 102 repeats shifting of the commencing time point and calculation of the values of the intermediate completing time point, the intermediate commencing time point, and the completing time point until the completing time point reaches time point t_m.

Note that a range from the commencing time point to the completing time point will be referred to as a comparison range.

Shifting of the commencing time point by the second computation unit 102 produces a plurality of comparison ranges.

Note that the commencing time point is not limited to the start time point (t_1) of the time-series data B, but any time may be specified as the commencing time point.

A difference integrated value computation unit 103 calculates an integrated value of a difference value between paired time points which are in the same positional relationship in the range from the start time point of the first linearly varying section to the end time point of the last linearly varying section in the time-series data A and in the range from the commencing time point to the completing time point, without calculating the values of respective time points between the start time point and the end time point of the respective linearly varying sections in the time-series data A, and the values of respective time points between the commencing time point and the completing time point.

More specifically, the difference integrated value computation unit 103 calculates the integrated value of the difference value between the paired time points, on the basis of the value of the start time point and the value of the end time point of each of the linearly varying sections in the time-series data A, the value of the commencing time point, the values of the respective intermediate commencing time points, the values of the respective intermediate completing time points, and the value of the completing time point.

The difference integrated value computation unit 103 performs the above-described operation for each comparison range.

Note that "the paired time points which are in the same positional relationship" is a pair of time point at the k-th position in the range from the start time point of the first linearly varying section to the end time point of the last linearly varying section in the time-series data A and time point at the k-th position in the range from the commencing time point to the completing time point in the time-series data B.

For example, in a comparison range in which the commencing time point is t_10 and the completing time point is t_j+9, time point t_1 in the time-series data A and time point t_10 in the time-series data B are in the same positional relationship.

Also, time point t_i in the time-series data A and time point t_i+9 in the time-series data B are in the same positional relationship.

Furthermore, time point t_j in the time-series data A and time point t_j+9 in the time-series data B are in the same positional relationship.

The difference integrated value computation unit 103 calculates the integrated value of the difference value between the paired time points which are in the same positional relationship without calculating the respective values in the time-series data A and the respective values in the time-series data B, or in other words, without decompressing the compressed time-series data A 201 and the compressed time-series data B 202.

The operation of the difference integrated value computation unit 103 corresponds to an example of a difference integrated value computation process.

An extraction unit 104 extracts the smallest integrated value from among a plurality of integrated values of a plurality of comparison ranges calculated by the difference integrated value computation unit 103.

The extraction unit 104 then extracts the commencing time point and the completing time point used for calculation of the extracted smallest integrated value.

The extraction unit 104 also extracts an integrated value being equal to or less than a threshold value from a plurality of integrated values calculated by the difference integrated value computation unit 103.

The extraction unit 104 then extracts the commencing time point and the completing time point used for calculation of the extracted integrated value being equal to or less than the threshold value.

The commencing time point and the completing time point extracted by the extraction unit 104 are output as an extraction result 300.

A storage unit 105 stores computation results of the first computation unit 101, computation results of the second computation unit 102, and computation results of the difference integrated value computation unit 103.

A control unit 106 controls operation of the first computation unit 101, the second computation unit 102, the difference integrated value computation unit 103, and the extraction unit 104.

*Description of Operation*

Next, example operation of the analysis device 100 according to the present embodiment will be described with reference to flowcharts of FIGS. 3 to 6.

Operation procedures illustrated in FIGS. 3 to 6 correspond to examples of the analysis method and the analysis program.

Figure 3:
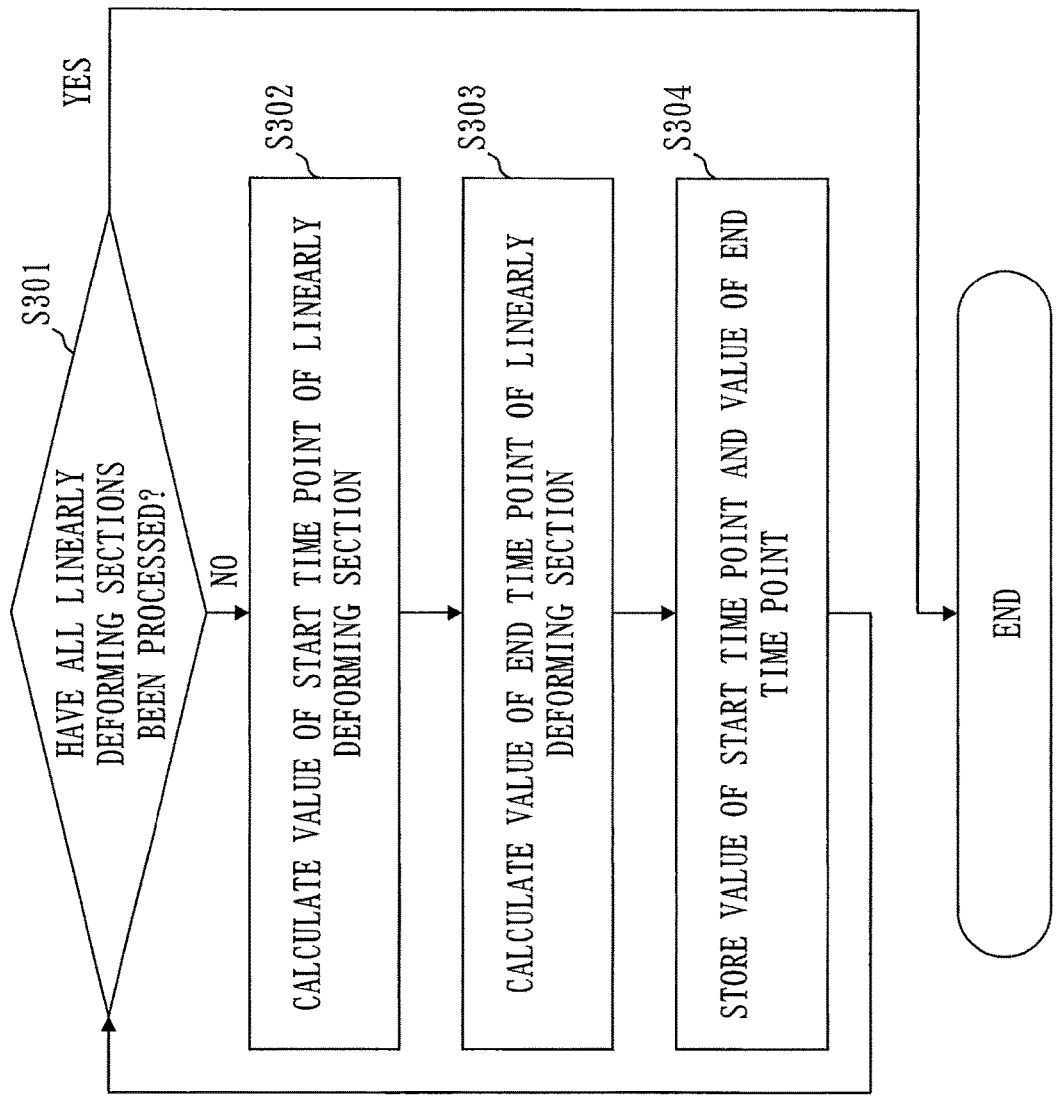
FIG. 3 is a flowchart illustrating example operation of a first computation unit according to the first embodiment.

FIG. 3 is a flowchart illustrating example operation of the first computation unit 101.

Figure 4:
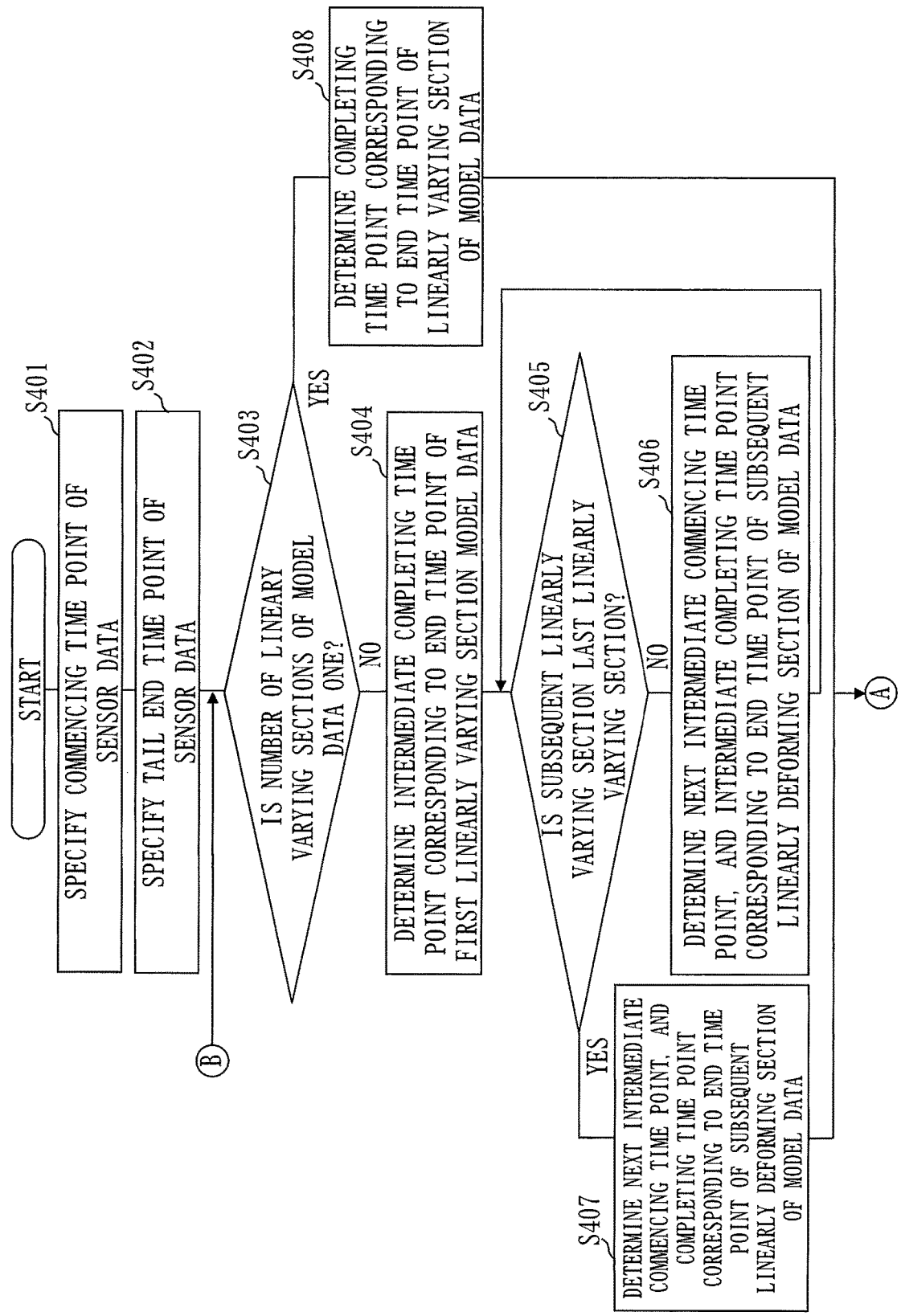
FIG. 4 is a flowchart illustrating example operation of a second computation unit according to the first embodiment.
Figure 5:
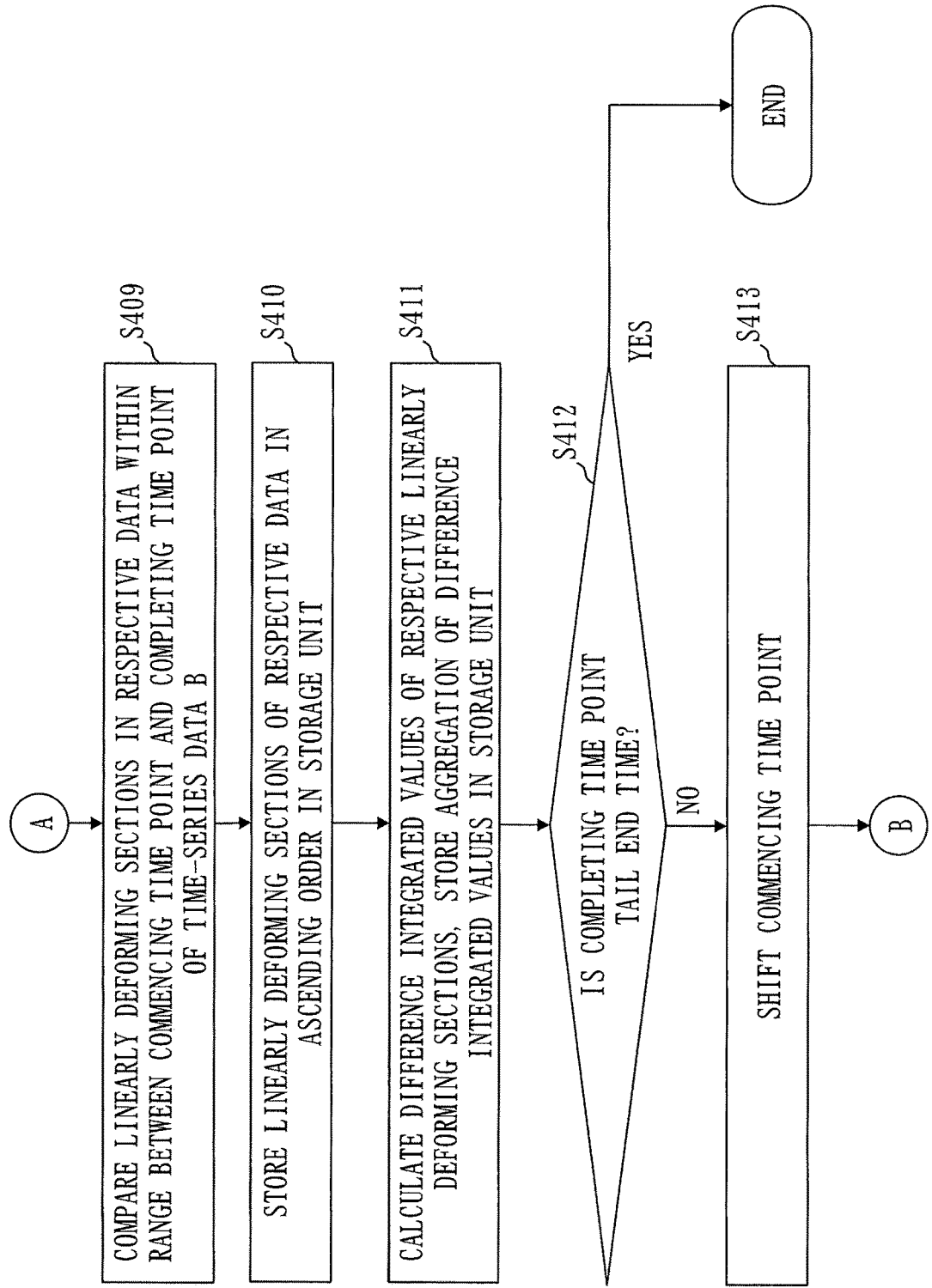
FIG. 5 is a flowchart illustrating example operation of the second computation unit according to the first embodiment.

FIGS. 4 and 5 are flowcharts illustrating example operation of the second computation unit 102.

Figure 6:
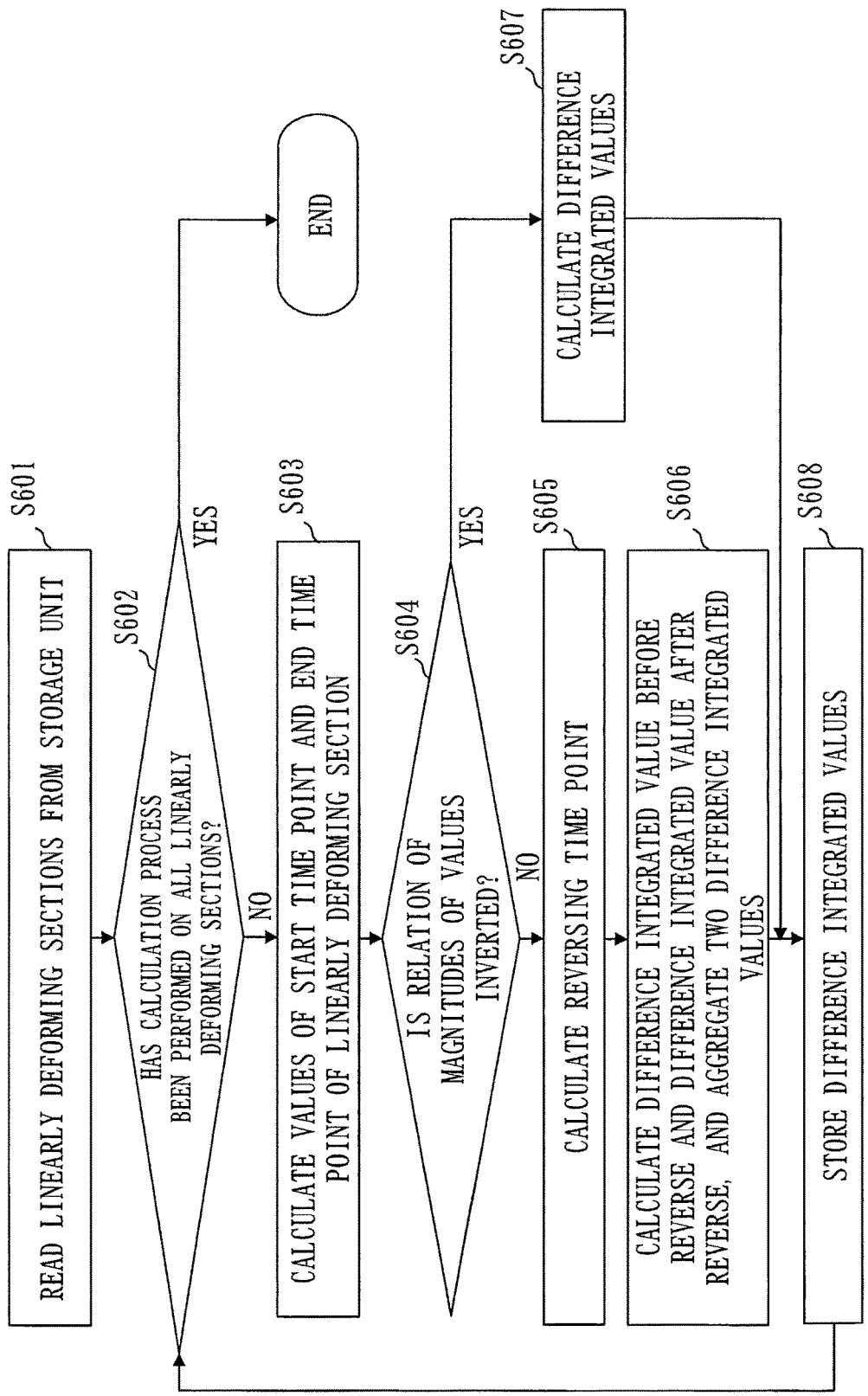
FIG. 6 is a flowchart illustrating example operation of a difference integrated value computation unit according to the first embodiment.

FIG. 6 is a flowchart illustrating example operation of the difference integrated value computation unit 103.

In FIG. 3, the first computation unit 101 first acquires the first variation coefficient of the compressed time-series data A202, and determines whether or not all the linearly varying sections of the time-series data A which is model data, have been processed (S301).

If an unprocessed linearly varying section is present (NO in S301), the first computation unit 101 calculates the value of the start time point of the linearly varying section (S302).

Note that, in the case of FIG. 2, the value written in the field of the predicted value is the value of the start time point of each linearly varying section, and thus extraction of the value written in the field of the predicted value is deemed as calculation of the value of the start time point by the first computation unit 101.

Subsequently, the first computation unit 101 calculates the value of the end time point of the linearly varying section (S303).

In the example of the first row in FIG. 2, since the initial value is 2.5, the inclination is 0.5, and the linearly varying time is i, the first computation unit 101 can calculates the value of the end time point by 2.5+(0.5×i).

Subsequently, the first computation unit 101 stores the value of the start time point calculated in S302 and the value of the end time point calculated in S303 in the storage unit 105 (S304).

If the processing of S302 to S304 has been performed for all of the linearly varying sections (YES in S301), the first computation unit 101 terminates the operation.

In FIG. 4, the second computation unit 102 specifies the commencing time point in the time-series data B which is sensor data (S401).

The second computation unit 102 may specify the first time point of the time-series data B as the commencing time point or may specify a specific time point as the commencing time point in accordance with an instruction from the user of the analysis device 100.

Subsequently, the second computation unit 102 specifies the tail end time point of the time-series data B (S402).

The tail end time point is a time point that is a reference for terminating shifting of the commencing time point.

When the completing time point has reached the tail end time point, the second computation unit 102 terminates shifting of the commencing time point.

The second computation unit 102 may specify the last time point of the time-series data B as the tail end time point or may specify a specific time point as the tail end time point in accordance with an instruction from the user of the analysis device 100.

Subsequently, the second computation unit 102 determines whether or not the number of linearly varying sections in the time-series data A which is model data, is one (S403).

If the number of linearly varying sections is one (YES in S403), the process proceeds to S408, and if the number of linearly varying sections is more than one (NO in S403), the process proceeds to S404.

In the example of FIG. 2, since the number of linearly varying sections in the time-series data A is two, the process proceeds to S404.

In S404, the second computation unit 102 determines an intermediate completing time point corresponding to the end time point of the first linearly varying section in the time-series data A which is model data (S404).

The second computation unit 102 specifies, as the intermediate completing time point, a time point obtained by adding a time width between the start time point and the end time point of the first linearly varying section of the time-series data A to the commencing time point.

When time point t_1 in FIG. 2 is specified as the commencing time point, the second computation unit 102 specifies time point t_i as the intermediate completing time point.

Subsequently, the second computation unit 102 determines whether or not the subsequent linearly varying section in the time-series data A is the last linearly varying section in the time-series data A (S405).

If the subsequent linearly varying section is not the last linearly varying section in the time-series data A (NO in S405), the second computation unit 102 determines the next intermediate commencing time point and an intermediate completing time point corresponding to the end time point of the subsequent linearly varying section in the time-series data A (S406).

The second computation unit 102 specifies, as the next intermediate commencing time point, a time point subsequent to the intermediate completing time point of the immediately preceding linearly varying section.

In addition, the second computation unit 102 specifies, as the intermediate completing time point, a time point obtained by adding a time width between the start time point and the end time point of the subsequent linearly varying section in the time-series data A to the intermediate commencing time point.

The second computation unit 102 then repeats S405 and S406 until the subsequent linearly varying section becomes the last linearly varying section in the time-series data A.

In S405, If the subsequent linearly varying section is the last linearly varying section in the time-series data A (YES in S405), the second computation unit 102 determines the next intermediate commencing time point and a completing time point corresponding to the end time point of the subsequent linearly varying section in the time-series data A (S407).

The second computation unit 102 specifies, as the next intermediate commencing time point, a time point subsequent to the intermediate completing time point of the immediately preceding linearly varying section.

In addition, the second computation unit 102 specifies, as the completing time point, a time point obtained by adding a time width between the start time point and the end time point of the subsequent linearly varying section in the time-series data A to the intermediate commencing time point.

When time point t_1 in FIG. 2 is specified as the commencing time point, the second computation unit 102 specifies time point t_j as the completing time point.

In addition, in S403, if the number of linearly varying sections in the time-series data A which is model data, is only one (YES in S403), a completing time point corresponding to the end time point of the linearly varying section in the time-series data A is determined (S408).

The second computation unit 102 specifies, as the completing time point, a time point obtained by adding a time width between the start time point and the end time point of the linearly varying section in the time-series data A to the commencing time point.

Subsequently, in FIG. 5, the second computation unit 102 compares the linearly varying sections in the time-series data A and the time-series data B in the range from the commencing time point to the completing time point of the time-series data B obtained previously (S409).

Since i+1<n<j<m is satisfied, the storage unit 105 stores the commencing time point of the time-series data B obtained previously, i, n, j and the completing time point of the time-series data B, as parameters for calculation of difference integrated values to be performed later (S410).

Subsequently, the difference integrated value computation unit 103 reads the parameters for calculation of difference integrated values stored in S410 from the storage unit 105, calculates difference integrated values in the order of the commencing time point to i, i to n, n to j, and j to the completing time point, and stores aggregation of the difference integrated values in the storage unit 105 (S411).

This step will be described below with reference to FIG. 6.

Subsequently, the second computation unit 102 determines whether or not the completing time point has reached the tail end time point (S411).

If the completing time point has reached the tail end time point (YES in S412), the second computation unit 102 then terminates the operation.

On the other hand, if the completing time point has not reached the tail end time point, (NO in S412) the second computation unit 102 shifts the commencing time point to the next time point (S413), and repeats processing in S403 and subsequent steps.

In FIG. 6, the difference integrated value computation unit 103 reads the parameters (linearly varying sections) for calculation of difference integrated values stored in S410 from the storage unit 105 (S601).

Subsequently, the difference integrated value computation unit 103 determines whether or not all the linearly varying sections have been processed (S602).

Herein, all the linearly varying sections refer to the sections of the commencing time point to i, i to n, n to j, and j to the completing time point mentioned in the description of S411.

If all the linearly varying sections have been processed (YES in S602), the difference integrated value computation unit 103 stores the result of aggregation of the difference integrated values of all the linearly varying sections in the storage unit 105, and terminates the process (S411).

On the other hand, if an unprocessed calculation range is present (NO in S602), the difference integrated value computation unit 103 reads the start time point and the end time point of the unprocessed linearly varying section from the storage unit 105 (S603).

The difference integrated value computation unit 103 determines whether or not the relation of magnitudes between values is inverted (S604).

For example, assume that the linearly varying sections, the commencing time point to i, i to n, n to j, and j to the completing time point in the time-series data A and B are respectively constituted by four linearly varying sections, which are a linearly varying section (1), a linearly varying section (2), a linearly varying section (3), and a linearly varying section (4).

The difference integrated value computation unit 103 determines whether the relation of magnitudes between the value of the start time point of the linearly varying section (1) in the time-series data A and the value of the commencing time point in the time-series data B is inverted at the relation of magnitudes between the value of the end time point of the linearly varying section (1) and the intermediate completing time point in the same positional relationship as the end time point.

The difference integrated value computation unit 103 also determines whether the relation of magnitudes between the value of the start time point of the linearly varying section (2) in the time-series data A and the value of the intermediate commencing time point in the same positional relationship as the start time point of the time-series data B is inverted at the relation of magnitudes between the value of the end time point of the linearly varying section (2) and the value of the intermediate completing time point in the same positional relationship as the end time point.

The difference integrated value computation unit 103 also determines whether the relation of magnitudes between the value of the start time point of the linearly varying section (3) in the time-series data A and the value of the intermediate commencing time point in the same positional relationship as the start time point of the time-series data B is inverted at the relation of magnitudes between the value of the end time point of the linearly varying section (3) and the value of the intermediate completing time point in the same positional relationship as the end time point.

In addition, the difference integrated value computation unit 103 determines whether the relation of magnitudes between the value of the start time point of the linearly varying section (4) in the time-series data A and the value of the intermediate commencing time point in the same positional relationship as the start time point in the time-series data B is inverted at the relation of magnitudes between the value of the end time point of the linearly varying section (4) and the value of the completing time point.

Assume here that, in the linearly varying section (1), the relation of magnitudes between the value of the start time point and the value of commencing time point is inverted at the relation of magnitudes between the value of the end time point and the value of the intermediate completing time point.

Also assume that the relation of magnitudes is not inverted in the linearly varying section (2), the linearly varying section (3), and the linearly varying section (4).

For the linearly varying section (1) where the relation of magnitudes is inverted, the difference integrated value computation unit 103 calculates reversing time point in step S605.

Specifically, a difference value in the start time point of the linearly varying section (1) between the time-series data A and B, and a difference value in variation coefficients between the time-series data A and B are calculated.

The value of k where the result of (the difference value between the time-series data A and B)−(the difference value in variation coefficients between the time-series data A and B×k) is 0 or negative is the reversing time point based on the start time point of the linearly varying section (1).

Subsequently, the difference integrated value computation unit 103 calculates a difference integrated value before reverse and a difference integrated value after reverse, and aggregate the two calculated difference integrated values (S606).

Specifically, the difference integrated value computation unit 103 calculates a difference integrated value for each of the commencing time point to the reversing time point and the reversing time point to i in the linearly varying section (1), and aggregates the difference integrated values.

Figure 7:
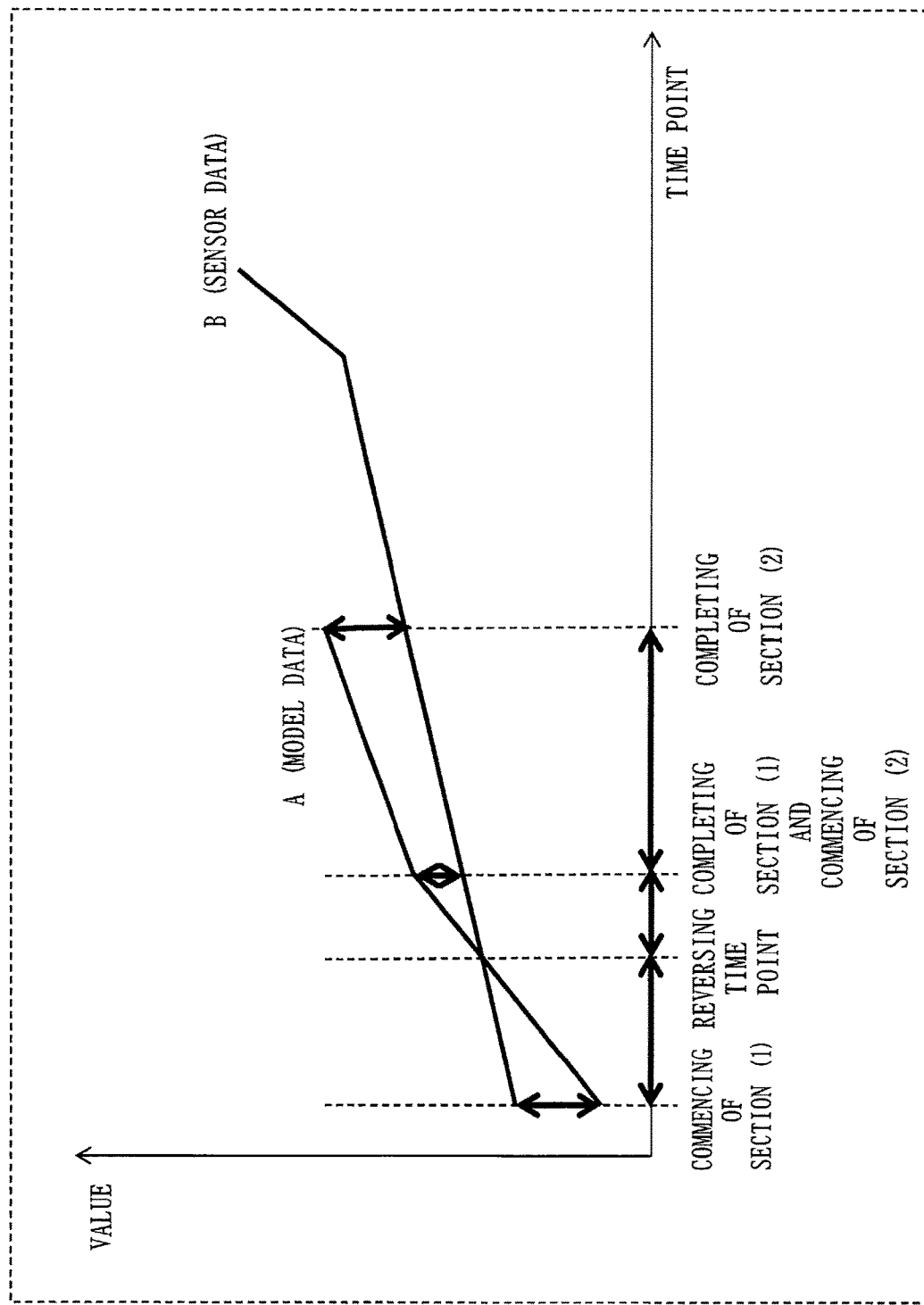
FIG. 7 is a graph explaining the principle of operation of the difference integrated value computation unit according to the first embodiment.

In this process, the difference integrated values can be obtained as follows (FIG. 7):
commencing time point to reversing time point:
(the distance between the time-series data A and B at the commencing time point)×(the distance between the commencing time point and the reversing time point)×(½)
reversing time point to i:
(the distance between the time-series data A and B at the completing time point)×(the distance between the completing time point and the reversing time point)×(½).

In addition, for the linearly varying sections (2), (3), and (4), the difference integrated value computation unit 103 can obtain the difference integrated values in step S607 as follows (FIG. 7):
{(the distance between the time-series data A and B at the commencing time point)+(the distance between the time-series data A and B at the completing time point)}×(the distance between the commencing time point and the completing time point)×(½).

Subsequently, the difference integrated value computation unit 103 stores the difference integrated values calculated in S606 or S607 in the storage unit 105 (S608).

In a case where a plurality of linearly varying sections are included in the time-series data A, the difference integrated value computation unit 103 aggregates all the difference integrated values calculated for the respective linearly varying sections, and stores the aggregate value in the storage unit 105.

The difference integrated value computation unit 103 determines whether or not the above-described process has been performed on all the comparison ranges (S602), and repeats the processing in S603 and subsequent steps if an unprocessed comparison range is present.

If the processing of S603 and subsequent steps has been performed on all the comparison ranges, the difference integrated value computation unit 103 terminates the process.

As described above, the difference integrated value computation unit 103 calculates, for each comparison range, an integrated value of a difference value between paired time points which are in the same positional relationship in the range from the start time point of the first linearly varying section in the time-series data A to the end time point of the last linearly varying section in the time-series data A and in the range from the commencing time point to the completing time point of the comparison range.

The extraction unit 104 reads a plurality of difference integrated values of a plurality of comparison ranges calculated by the difference integrated value computation unit 103 from the storage unit 105.

The extraction unit 104 then extracts the smallest difference integrated value from among the plurality of difference integrated values.

Furthermore, the extraction unit 104 extracts the commencing time point and the completing time point used for calculation of the extracted smallest difference integrated value.

The extraction unit 104 may also extract a difference integrated value being equal to or less than a threshold value from the plurality of difference integrated values calculated by the difference integrated value computation unit 103.

In this case as well, the extraction unit 104 extracts the commencing time point and the completing time point used for calculation of the extracted difference integrated value being equal to or less than the threshold value.

The extraction unit 104 then outputs an extraction result 300 describing the extracted commencing time point and completing time point.

The part between the commencing time point and the completing time point of the time-series data B described in the extraction result 300 is the part that has high similarity degree with the time-series data A which is model data.

*Description of Effects of Embodiment*

As described above, according to the present embodiment, an integrated value of a difference value between paired time points which are in the same positional relationship in a range from a start time point to an end time point and in a range from a commencing time point to an completing time point can be calculated without calculation of the values of the respective time points between the start time point and the end time point and the values of respective time points between the commencing time point and the completing time point.

Threrefore, it is not necessary to calculate the difference value for each pair of time points and it is not necessary to integrate the difference value of each pair of time points, which allows the similarity degree between a plurality pieces of time-series data to be efficiently obtained.

\*\*\*Others\*\*\*

While an example in which the time-series data A which is model data, is constituted by a plurality of linearly varying sections has been described above, the time-series data A may be constituted by one linearly varying section.

In addition, while an example in which the time-series data B which is sample data, is also constituted by a plurality of linearly varying sections have been described, the time-series data B may be constituted by one linearly varying section.

In this case, the first computation unit 101 acquires the first variation coefficient from the compressed time-series data A 201, and calculates the value of the start time point and the value of the end time point on the basis of the acquired first variation coefficient.

Furthermore, the second computation unit 102 acquires the second variation coefficient from the compressed time-series data B 202, and calculates the value of the commencing time point which is a given time in the time-series data B, and the value of the completing time point obtained by adding a time width between the start time point and the end time point to the commencing time point on the basis of the acquired second variation coefficient.

In addition, the second computation unit 102 repeats the operation of shifting the commencing time point at each step size (sampling period), and calculating a value of a new commencing time point after the shift, and a value of a new completing time point obtained by adding a time width between the start time point and the end time point to the new commencing time point, on the basis of the second variation coefficient.

In addition, the difference integrated value computation unit 103 calculates an integrated value of a difference value between paired time points which are in the same positional relationship in the range from the start time point to the end time point and in the range from the commencing time point to the completing time point on the basis of the value of the start time point, the value of the end time point, the value of the commencing time point, and the value of the completing time point, without calculating the values of respective time points between the start time point and the end time point and the values of respective time points between the commencing time point and the completing time point.

The difference integrated value computation unit 103 also determines whether or not the relation of magnitudes between the value of the start time point and the value of the commencing time point is inverted at the relation of magnitudes between the value of the end time point and the value of the completing time point.

If the relation of magnitudes between the value of the start time point and the value of the commencing time point is inverted at the relation of magnitudes between the value of the end time point and the value of the completing time point is inverted, the difference integrated value computation unit 103 then extracts, as a first reversing time point, a time point in the time-series data A at which the relation of magnitudes between the value of the start time point and the value of commencing time point is reversed.

Furthermore, the difference integrated value computation unit 103 extracts, as a second reversing time point, a time point in the time-series data B at which the relation of magnitudes between the value of the start time point and the value of the commencing time point is reversed.

The difference integrated value computation unit 103 then calculates, as a difference integrated value before reverse, an integrated value of a difference value between paired time points which are in the same positional relationship in the range from the start time point to the first reversing time point and in the range from the commencing time point to the second reversing time point.

The difference integrated value computation unit 103 also calculates, as a difference integrated value after reverse, an integrated value of a difference value between paired time points which are in the same positional relationship in the range from the first reversing time point to the end time point and in the range from the second reversing time point to the completing time point.

Furthermore, the difference integrated value computation unit 103 obtains an aggregate value of the difference integrated value before reverse and the difference integrated value after reverse as an integrated value of a difference value between paired time points which are in the same positional relationship in the range from the start time point to the end time point and in the range from the commencing time point to the completing time point.

\*\*\*Description of Example Hardware Configuration\*\*\*

Finally, an example hardware configuration of the analysis device 100 will be described with reference to FIG. 8.

The analysis device 100 is a computer.

The analysis device 100 includes hardware components such as a processor 901, an auxiliary storage device 902, a memory 903, a communication device 904, an input interface 905, and a display interface 906.

The processor 901 is connected to other hardware components via a signal line 910, and controls these hardware components.

The input interface 905 is connected to an input device 907.

The display interface 906 is connected to a display 908.

The processor 901 is an integrated circuit (IC) to perform processing.

The processor 901 is, for example, a central processing unit (CPU), a digital signal processor (DSP), or a graphics processing unit (GPU).

The auxiliary storage device 902 is a read only memory (ROM), a flash memory, or a hard disk drive (HDD), for example.

The storage unit 105 illustrated in FIG. 1 is implemented by the auxiliary storage device 902, for example.

The memory 903 is a random access memory (RAM), for example.

The communication device 904 includes a receiver 9041 to receive data, and a transmitter 9042 to transmit data.

The communication device 904 is a communication chip or a network interface card (NIC), for example.

The input interface 905 is a port to which a cable 911 of the input device 907 is connected.

The input interface 905 is a universal serial bus (USB) terminal, for example.

The display interface 906 is a port to which a cable 912 of the display 908 is connected.

The display interface 906 is, for example, a USB terminal or an HDMI (registered trademark) (high definition multimedia interface) terminal.

The input device 907 is, for example, a mouse, a keyboard, or a touch panel.

The display 908 is, for example, a liquid crystal display (LCD).

The auxiliary storage device 902 stores programs to implement the functions of the first computation unit 101, the second computation unit 102, the difference integrated value computation unit 103, the extraction unit 104, and the control unit 106 (hereinafter, these units will be collectively referred to as "units") illustrated in FIG. 1.

The programs are loaded into the memory 903, read by the processor 901, and executed by the processor 901.

Furthermore, the auxiliary storage device 902 also stores an operating system (OS).

At least part of the OS is loaded into the memory 903, and the processor 901 executes the programs to implement the functions of the "units" while executing the OS.

While one processor 901 is illustrated in FIG. 8, the analysis device 100 may include a plurality of processors 901.

The plurality of processors 901 may then execute the programs to implement the functions of the "units" in cooperation with one another.

Furthermore, information, data, signal values, and variable values representing results of processing performed by the "units" are stored in the memory 903, the auxiliary storage device 902, or a register or a cache memory in the processor 901.

Furthermore, the programs to implement the functions of the "units" are stored in a storage medium such as a magnetic disk, a flexible disk, an optical disk, a compact disk, a Blu-ray (registered trademark) disk, or a DVD.

The "units" may alternatively be provided in the form of "circuitry."

Alternatively, a "unit" may be read as a "circuit," a "step," a "procedure," or a "process."

The "circuit" and "circuitry" are concepts including not only the processor 901 but also other types of processing circuits such as a logic IC, a gate array (GA), an application specific integrated circuit (ASIC), and a field-programmable gate array (FPGA).

REFERENCE SIGNS LIST

100: analysis device, 101: first computation unit, 102: second computation unit, 103: difference integrated value computation unit, 104: extraction unit, 105: storage unit, 106: control unit, 201: compressed time-series data A, 202: compressed time-series data B, 300: extraction result

The invention claimed is:

1. An analysis device comprising:
processing circuitry to:
acquire, from a sensor, sensor data;
acquire, as a first variation coefficient, a variation coefficient representing a characteristics of linear variation of first time-series data in which values of a plurality of time points taken at a constant step size linearly vary, extract a value of a start time point of the first time-series data and calculate a value of an end time point of the first time-series data on the basis of the acquired first variation coefficient;
acquire, as a second variation coefficient, a variation coefficient representing a characteristics of linear variation of second time-series data obtained by compression of the sensor data, in which values of a plurality of time points taken at the step size linearly vary, and calculate a value of a commencing time point, which is a given time point in the second time-series data, and a value of a completing time point obtained by adding a time width between the start time point and the end time point to the commencing time point, on the basis of the acquired second variation coefficient; and
calculate an integrated value of a difference value between paired time points which are in the same positional relationship in a range from the start time point to the end time point and in a range from the commencing time point to the completing time point on the basis of the value of the start time point, the value of the end time point, the value of the commencing time point, and the value of the completing time point, without calculating values of respective time points between the start time point and the end time point and values of respective time points between the commencing time point and the completing time point.

2. The analysis device according to claim 1, wherein the processing circuitry repeats operation of shifting the commencing time point at each step size and calculating a value of a new commencing time point after the shifting and a value of a new completing time point obtained by adding the time width between the start time point and the end time point to the new commencing time point, on the basis of the second variation coefficient, and the processing circuitry calculates an integrated value of a difference value between paired time points which are in the same positional relationship in the range from the start time point to the end time point and in a range from the new commencing time point to the new completing time point, on the basis of the value of the start time point, the value of the end time point, the value of the new commencing time point, and the value of the new completing time point, without calculating values of respective time points between the start time point and the end time point and values of respective time points between the new commencing time point and the new completing time point.

3. The analysis device according to claim 2, wherein when the value of the new commencing time point and the value of the new completing time point are calculated, the processing circuitry determines whether or not a relation of magnitudes between the value of the start time point and the value of the new commencing time point is inverted at a relation of magnitudes between the value of the end time point and the value of the new completing time point, and when the relation of magnitudes between the value of the start time point and the value of the new commencing time point is inverted at the relation of magnitudes between the value of the end time point and the value of the new completing time point, the processing circuitry:

extracts, as a new first reversing time point, a time point in the first time-series data at which the relation of magnitudes between the value of the start time point and the value of the new commencing time point is reversed;

extracts, as a new second reversing time point, a time point in the second time-series data at which the relation of magnitudes between the value of the start time point and the value of the new commencing time point is reversed;

calculates, as a new difference integrated value before reverse, an integrated value of a difference value between paired time points which are in the same positional relationship in a range from the start time point to the new first reversing time point and in a range from the new commencing time point to the new second reversing time point;

calculates, as a new difference integrated value after reverse, an integrated value of a difference value between paired time points which are in the same positional relationship in a range from the new first reversing time point to the end time point and in a range from the new second reversing time point to the new completing time point; and obtains an aggregate value of the new difference integrated value before reverse and the new difference integrated value after reverse, as the integrated value of the difference value between the paired time points which are in the same positional relationship in the range from the start time point to the end time point and in the range from the new commencing time point to the new completing time point.

4. The analysis device according to claim 2, wherein the processing circuitry extracts a smallest difference integrated value from a plurality of difference integrated values calculated, and extract a commencing time point and a completing time point used for calculation of the extracted smallest difference integrated value.

5. The analysis device according to claim 2, wherein the processing circuitry extracts a difference integrated value being equal to or less than a threshold value from a plurality of difference integrated values calculated, and extract a commencing time point and a completing time point used for calculation of the extracted difference integrated value being equal to or less than the threshold value.

6. The analysis device according to claim 1, wherein the processing circuitry determines whether or not a relation of magnitudes between the value of the start time point and the value of the commencing time point is inverted at a relation of magnitudes between the value of the end time point and the value of the completing time point, and when the relation of magnitudes between the value of the start time point and the value of the commencing time point is inverted at the relation of magnitudes between the value of the end time point and the value of the completing time point, the processing circuitry:

extracts, as a first reversing time point, a time point in the first time-series data at which the relation of magnitudes between the value of the start time point and the value of the commencing time point is reversed;

extracts, as a second reversing time point, a time point in the second time-series data at which the relation of magnitudes between the value of the start time point and the value of the commencing time point is reversed;

calculates, as a difference integrated value before reverse, an integrated value of a difference value between paired time points which are in the same positional relationship in a range from the start time point to the first reversing time point and in a range from the commencing time point to the second reversing time point;

calculates, as a difference integrated value after reverse, an integrated value of a difference value between paired time points which are in the same positional relationship in a range from the first reversing time point to the end time point and in a range from the second reversing time point to the completing time point; and obtains an aggregate value of the difference integrated value before reverse and the difference integrated value after reverse, as the integrated value of the difference value between the paired time points which are in the same positional relationship in the range from the start time point to the end time point and in the range from the commencing time point to the completing time point.

7. The analysis device according to claim 1, wherein the processing circuitry:

acquires, as the first variation coefficient, a variation coefficient for each of linearly varying sections of the first time-series data which is sectioned into the lierarly varying sections, the linearly varying sections having different linear variation characteristics from one another;

extracts a value of a start time point of linearly varying section and calculates a value of an end time point of linearly varying section, for each of the linearly varying sections, on the basis of the acquired first variation coefficient, acquires, as the second variation coefficient, a variation coefficient for each of linearly varying sections of the second time-series data which is sectioned into the lierarly varying sections, the linearly varying sections having different linear variation characteristics from one another;

calculates the value of the commencing time point and a value of an intermediate completing time point obtained by adding a time width between a start time point and an end time point of a first linearly varying section in the first time-series data to the commencing time point, further calculates a value of an intermediate commencing time point being a time point subsequent to the intermediate completing time point, and calculates a value of another intermediate completing time point obtained by adding a time width between a start time point and an end time point of a subsequent linearly varying section in the first time-series data to the intermediate commencing time point, to calculate a value of a completing time point corresponding to an end time point of a last linearly varying section in the first time-series data, on the basis of the acquired second variation coefficient, and calculates an integrated value of a difference value between paired time points which are in the same positional relationship in a range from the start time point of the first linearly varying section in the first time-series data to the end time point of the last linearly varying section in the first time-series data and in a range from the commencing time point to the completing time point, on the basis of values of start time points and values of end time points of the respective linearly varying sections in the first time-series data, the value of the commencing time point, the values of each of intermediate commencing time points, and the values of each of intermediate completing time points, the value of the completing time point, without calculating values of repective time points between the start time point and the end time point of the respective linearly varying sections in the first time-series data and values of respective time points between the commencing time point and the completing time point.

8. The analysis device according to claim 7, wherein
the processing circuitry repeats operation of shifting the commencing time point at each step size and calculating a value of a new commencing time point after the shifting and a value of a new intermediate commencing time point, a value of a new intermediate completing time point, and a value of a new completing time point corresponding to the new commencing time point, on the basis of the second variation coefficient, and
calculates an integrated value of a difference value between paired time points which are in the same positional relationship in a range from the start time point of the first linearly varying section in the first time-series data to the end time point of the last linearly varying sections in the first time-series data and in a range from the new commencing time point to the new completing time point, on the basis of the values of start time points and the values of end time points of the respective linearly varying sections in the first time-series data, the value of the new commencing time point, the values of respective new intermediate commencing time points, the values of respective new intermediate completing time points, and the value of the new completing time point, without calculating values of respective time points between the start time point and the end time point of the respective linearly varying sections in the first time-series data and value of respective time points between the new commencing time point and the new completing time point.

9. The analysis device according to claim 8, wherein
the processing circuitry extracts a smallest difference integrated value from a plurality of difference integrated values calculated, and extract a commencing time point and a completing time point used for calculation of the extracted smallest difference integrated value.

10. The analysis device according to claim 8, wherein
the processing circuitry extracts a difference integrated value being equal to or less than a threshold value from a plurality of difference integrated values calculated, and extract a commencing time point and a completing time point used for calculation of the extracted difference integrated value being equal to or less than the threshold value.

11. The analysis device according to claim 7, wherein
the processing circuitry determines whether or not a relation of magnitudes between the value of the start time point of the first linearly varying section in the first time-series data and the value of the commencing time point is inverted at a relation of magnitudes between the value of the end time point of the first linearly varying section in the first time-series data and the value of the intermediate completing time point corresponding to the end time point, and
when the relation of magnitudes between the value of the start time point and the value of the commencing time point is inverted at the relation of magnitudes between the value of the end time point and the value of the intermediate completing time point,
the processing circuitry:
extracts, as a first reversing time point, a time point in the first time-series data at which the relation of magnitudes between the value of the start time point and the value of the commencing time point is reversed;
extracts, as a second reversing time point, a time point in the second time-series data at which the relation of magnitudes between the value of the start time point and the value of the commencing time point is reversed;
calculates, as a difference integrated value before reverse, an integrated value of a difference value between paired time points which are in the same positional relationship in a range from the start time point to the first reversing time point and in a range from the commencing time point to the second reversing time point;
calculates, as a difference integrated value after reverse, an integrated value of a difference value between paired time points which are in the same positional relationship in a range from the first reversing time point to the end time point and in a range from the second reversing time point to the intermediate completing time point; and
obtains an aggregate value of the difference integrated value before reverse and the difference integrated value after reverse, as the integrated value of the difference value between the paired time points which are in the same positional relationship in the range from the start time point to the end time point and in the range from the commencing time point to the intermediate completing time point.

12. The analysis device according to claim 7, wherein
the processing circuitry determines whether or not a relation of magnitudes between a value of a start time point of an intermediate linearly varying section being a linearly varying section being other than the first linearly varying section and the last linearly varying section in the first time-series data and a value of an intermediate commencing time point corresponding to the start time point is inverted at a relation of magnitudes between a value of an end time point of the intermediate linearly varying section in the first time-series data and a value of an intermediate completing time point corresponding to the end time point, and
when the relation of magnitudes between the value of the start time point and the value of the intermediate commencing time point is inverted at the relation of magnitudes between the value of the end time point and the value of the intermediate completing time point,
the processing circuitry:
extracts, as a first reversing time point, a time point in the first time-series data at which the relation of magnitudes between the value of the start time point and the value of the intermediate commencing time point is reversed;
extracts, as a second reversing time point, a time point in the second time-series data at which the relation of magnitudes between the value of the start time point and the value of the intermediate commencing time point is reversed;
calculates, as a difference integrated value before reverse, an integrated value of a difference value between paired time points which are in the same positional relationship in a range from the start time point to the first reversing time point and in a range from the intermediate commencing time point to the second reversing time point;
calculates, as a difference integrated value after reverse, an integrated value of a difference value between paired time points which are in the same positional relationship in a range from the first reversing time point to the end time point and in a range from the second reversing time point to the intermediate completing time point; and obtains an aggregate value of the difference integrated value before reverse and the difference integrated value after reverse, as the integrated value of the difference value between the paired time points which are in the same positional relationship in the range from the start time point to the end time point and in the range from the intermediate commencing time point to the intermediate completing time point.

13. The analysis device according to claim 7, wherein
the processing circuitry determines whether or not a relation of magnitudes between the value of the start time point of the last linearly varying section in the first time-series data and the value of the intermediate commencing time point corresponding to the start time point is inverted at a relation of magnitudes between a value of an end time point of the last linearly varying section in the first time-series data and the value of the completing time point,
when the relation of magnitudes between the value of the start time point and the value of the intermediate commencing time point is inverted at the relation of magnitudes between the value of the end time point and the value of the completing time point,
the processing circuitry:
extracts, as a first reversing time point, a time point in the first time-series data at which the relation of magnitudes between the value of the start time point and the value of the intermediate commencing time point is reversed;
extracts, as a second reversing time point, a time point in the second time-series data at which the relation of magnitudes between the value of the start time point and the value of the intermediate commencing time point is reversed;
calculates, as a difference integrated value before reverse, an integrated value of a difference value between paired time points which are in the same positional relationship in a range from the start time point to the first reversing time point and in a range from the intermediate commencing time point to the second reversing time point;
calculates, as a difference integrated value after reverse, an integrated value of a difference value between paired time points which are in the same positional relationship in a range from the first reversing time point to the end time point and in a range from the second reversing time point to the completing time point; and
obtains an aggregate value of the difference integrated value before reverse and the difference integrated value after reverse, as the integrated value of the difference value between the paired time points which are in the same positional relationship in the range from the start time point to the end time point and in the range from the intermediate commencing time point to the completing time point.

14. An analysis method comprising:
acquiring, from a sensor, sensor data;
acquiring, as a first variation coefficient, a variation coefficient representing a characteristics of linear variation of first time-series data in which values of a plurality of time points taken at a constant step size linearly vary, extracting a value of a start time point of the first time-series and calculating a value of an end time point of the first time-series data on the basis of the acquired first variation coefficient;
acquiring, as a second variation coefficient, a variation coefficient representing a characteristics of linear variation of second time-series data obtained by compression of the sensor data, in which values of a plurality of time points taken at the step size linearly vary, and calculating a value of a commencing time point, which is a given time point in the second time-series data, and a value of a completing time point obtained by adding a time width between the start time point and the end time point to the commencing time point, on the basis of the acquired second variation coefficient; and
calculating an integrated value of a difference value between paired time points which are in the same positional relationship in a range from the start time point to the end time point and in a range from the commencing time point to the completing time point on the basis of the value of the start time point, the value of the end time point, the value of the commencing time point, and the value of the completing time point, without calculating values of respective time points between the start time point and the end time point and values of respective time points between the commencing time point and the completing time point.

15. A non-transitory computer readable medium storing an analysis program causing a computer to execute:
a process of acquiring, from a sensor, sensor data;
a first computation process of acquiring, as a first variation coefficient, a variation coefficient representing a characteristics of linear variation of first time-series data in which values of a plurality of time points taken at a constant step size linearly vary, extracting a value of a start time point of the first time-series data and calculating a value of an end time point of the first time-series data on the basis of the acquired first variation coefficient;
a second computation process of acquiring, as a second variation coefficient, a variation coefficient representing a characteristics of linear variation of second time-series data obtained by compression of the sensor data, in which values of a plurality of time points taken at the step size linearly vary and calculating a value of a commencing time point, which is a given time point in the second time-series data, and a value of a completing time point obtained by adding a time width between the start time point and the end time point to the commencing time point, on the basis of the acquired second variation coefficient; and
a difference integrated value computation process of calculating an integrated value of a difference value between paired time points which are in the same positional relationship in a range from the start time point to the end time point and in a range from the commencing time point to the completing time point on the basis of the value of the start time point, the value of the end time point, the value of the commencing time point, and the value of the completing time point, without calculating values of respective time points between the start time point and the end time point and values of respective time points between the commencing time point and the completing time point.

* * * * *